United States Patent
Fukunaga et al.

(10) Patent No.: US 8,742,292 B2
(45) Date of Patent: Jun. 3, 2014

(54) ROBOT CONTROLLER THAT CONTROLS TANDEM ARC WELDING SYSTEM, ARC TRACKING CONTROLLING METHOD USING THE ROBOT CONTROLLER, AND THE TANDEM ARC WELDING SYSTEM

(75) Inventors: Atsushi Fukunaga, Fujisawa (JP); Takeshi Koike, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 546 days.

(21) Appl. No.: 13/083,949

(22) Filed: Apr. 11, 2011

(65) Prior Publication Data

US 2011/0278272 A1    Nov. 17, 2011

(30) Foreign Application Priority Data

May 11, 2010  (JP) ................. 2010-109122

(51) Int. Cl.
*B23K 9/12* (2006.01)
*B23K 15/00* (2006.01)

(52) U.S. Cl.
USPC .................. 219/130.01; 219/125.12

(58) Field of Classification Search
USPC ...... 219/130.01–130.33, 136, 137 R, 137 PS, 219/125.1, 125.12, 126
See application file for complete search history.

(56) References Cited

U.S. PATENT DOCUMENTS

2008/0083716 A1   4/2008  Shigeyoshi

FOREIGN PATENT DOCUMENTS

| JP | 2005-177796 | 7/2005 |
|----|-------------|--------|
| JP | 2007-260767 | 10/2007 |
| JP | 2008-93670  | 4/2008 |

OTHER PUBLICATIONS

Extended European Search Report issued Dec. 21, 2011 in patent application No. 11003038.4.

*Primary Examiner* — Sang Y Paik
(74) *Attorney, Agent, or Firm* — Oblon, Spivak, McClelland, Maier & Neustadt, L.L.P.

(57) ABSTRACT

A robot controller that controls a tandem arc welding system according to the present invention includes a leading-electrode correcting section that calculates a leading-electrode correction amount, used for correcting a displacement in a left-right direction and an up-down direction, from a leading-electrode changing amount calculated by a leading-electrode processing section; a leading-electrode correcting section that calculates a trailed-electrode correction amount, used for correcting a displacement in a rotational direction, from a trailed-electrode changing amount calculated by a trailed-electrode processing section; a rotational-displacement correction controlling processing section that calculates a rotational-center correction amount for correcting the displacement of the leading electrode; and a robot trajectory planning processing section that corrects a teaching position and a position of a rotational center of a welding torch during tracking correction. By such a structure, even if arc tracking is carried out at any rotational center, displacement of the leading electrode does not occur, so that defective welding does not occur.

8 Claims, 8 Drawing Sheets

ROBOT CONTROLLER THAT CONTROLS TANDEM ARC WELDING SYSTEM, ARC TRACKING CONTROLLING METHOD USING THE ROBOT CONTROLLER, AND THE TANDEM ARC WELDING SYSTEM

BACKGROUND OF THE INVENTION

1. Field of the Invention

The present invention relates to a robot controller that controls a tandem arc welding system that performs arc welding by causing a welding torch to move so as to track a weld line while the welding torch is caused to weave leftwards and rightwards using a robot along a V-shaped or an L-shaped groove or a groove that is similar to the V-shaped or the L-shaped groove. The welding torch includes two electrodes. In addition, the present invention relates to an arc tracking controlling method using the robot controller, and a tandem arc welding system.

2. Description of the Related Art

As a related technology regarding arc tracking when carrying out related tandem arc welding, for example, a technology discussed in Japanese Unexamined Patent Application Publication No. 2008-93670 is provided. In this technology, arc tracking is performed by calculating a correction amount from amounts of electrical changes of a leading electrode and a trailed electrode in one weaving period. In addition, in this technology, the arc tracking is carried out by rotating the trailed electrode around the leading electrode. That is, in the related arc tracking performed during the tandem arc welding, the arc tracking of the trailed electrode is carried out to perform correction around a leading electrode torch. Accordingly, it is necessary to set the rotational center, that is, a tool center point (TCP) at the leading electrode.

Here, the tandem arc welding that is performed using a robot that performs the welding is carried out by previously teaching a work trajectory and reproducing the stored trajectory. The teaching of the work trajectory is performed after specifying the aforementioned TCP. In a tandem arc welding system, the position of a wire end of the leading electrode, the position of a wire end of the trailed electrode, and a position between the electrodes are previously set as angles and distances from a flange surface of the robot, and are changeable according to the conditions.

Figure 9A:
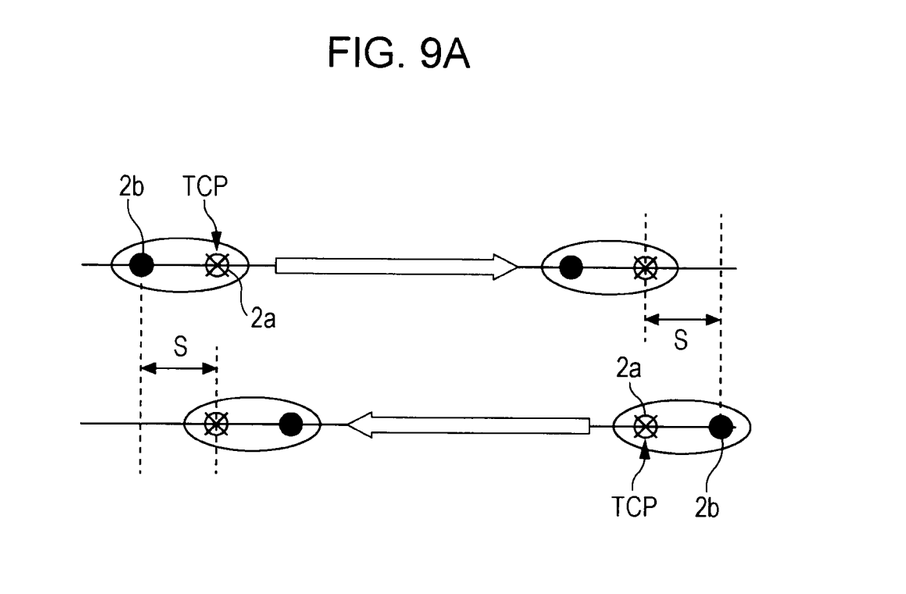
FIGS. 9A and 9B are schematic views for when a robot operation direction is changed in tandem arc welding, with FIG. 9A showing a case in which TCP is set at a leading electrode and this is taught and FIG. 9B showing a case in which the TCP is set at an intermediate position between the leading electrode and a trailed electrode and this is taught.
Figure 9B:
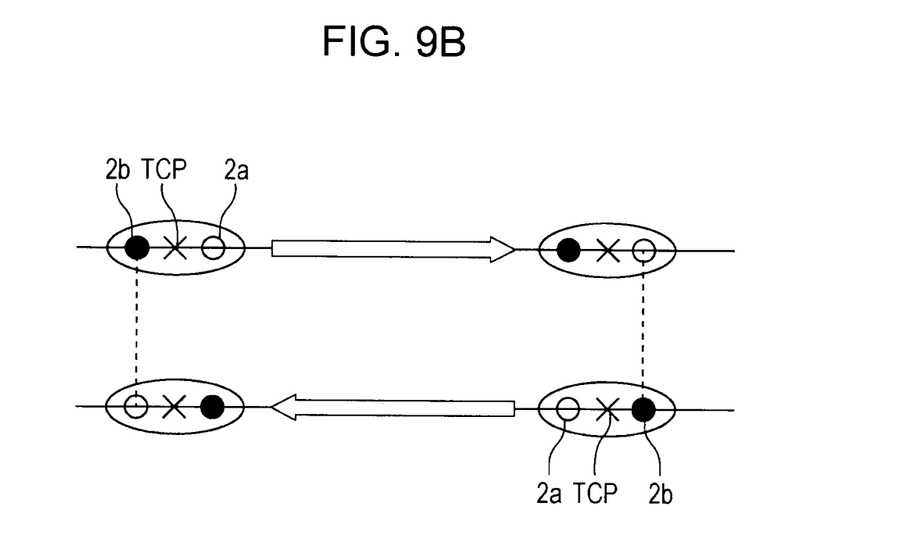

In the tandem arc welding, setting the TCP at an intermediate position between the leading electrode and the trailed electrode may be advantageous from the viewpoint of operation. For example, as shown in FIGS. 9A and 9B, changing a direction of operation of the robot applies to such a case. As shown in FIG. 9A, when the TCP is set at the leading electrode 2a and this is taught, if the direction of operation is changed to the opposite direction without changing a teaching position, an end point changes by a distance S. Therefore, the welding torch and a welded structure interfere with each other, thereby making it necessary to correct the teaching position. In contrast, as shown in FIG. 9B, when the TCP is set at an intermediate position between the leading electrode 2a and the trailed electrode 2b, and this is taught, even if the direction of operation is changed to the opposite direction without changing a teaching position, an end point does not change. Therefore, the amount of correction of the teaching position is reduced.

Figure 10A:
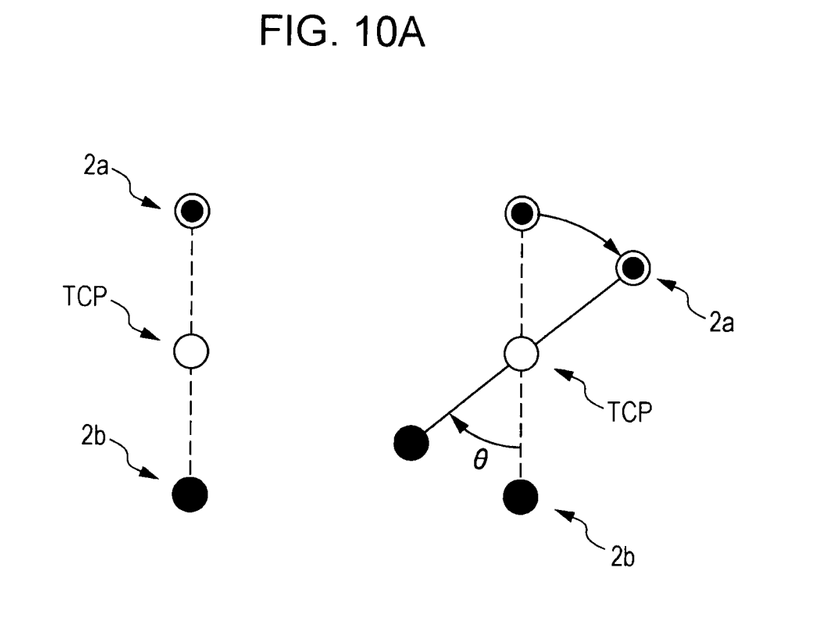
FIGS. 10A and 10B are each a schematic view of arc tracking of the trailed electrode in tandem arc welding, with FIG. 10A showing a case in which TCP is set at an intermediate position between the leading electrode and the trailed electrode and FIG. 10B showing a case in which the TCP is set at the leading electrode.
Figure 10B:
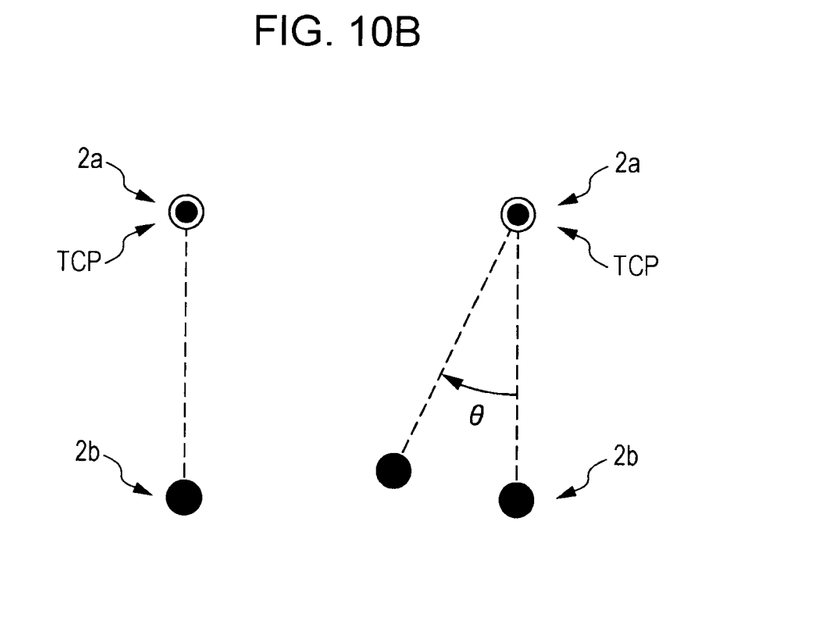

However, when, for example, in the arc tracking discussed in the aforementioned Japanese Unexamined Patent Application Publication No. 2008-93670, the TCP is set at a position other than where the leading electrode 2a is disposed, such as an intermediate position between the leading electrode 2a and the trailed electrode 2b, the following occurs. That is, as shown in FIG. 10A, the arc tracking of the trailed electrode 2b rotates around the intermediate position between the leading electrode 2a and the trailed electrode 2b (corresponding to the TCP) as a rotational center, so that the position of the leading electrode 2a changes as a result of the arc tracking of the trailed electrode 2b. When the position of the leading electrode 2a changes during arc welding in this way, locations that actually need to be welded are not welded. This may result in defective welding, such as weld penetration. Therefore, in the arc tracking discussed in the aforementioned Japanese Unexamined Patent Application Publication No. 2008-93670, in order to minimize defective welding, it is necessary to set the TCP at the leading electrode 2a and correct the teaching position as shown in FIG. 10B.

SUMMARY OF THE INVENTION

Accordingly, the present invention is made to overcome such a problem, and has as its object the provision of a robot controller, an arc tracking controlling method using the robot controller, and a tandem arc welding system. The robot controller controls the tandem arc welding system that can perform arc welding without defective welding that is prevented by preventing displacement of a leading electrode even when arc tracking is performed at any rotational center between the leading electrode and a trailed electrode.

According to a first aspect of the present invention, there is provided a robot controller for controlling a position of a welding torch of a tandem arc welding system that performs arc welding while tracking a weld line. The tandem arc welding system includes the welding torch having a leading electrode and a trailed electrode disposed apart from each other by a predetermined distance in a direction of the weld line, a robot that causes the welding torch mounted to an end of the robot to weave leftwards and rightwards with respect to a welding direction, a welding power supply that supplies electric power to the leading electrode and the trailed electrode, and a current/voltage detector that detects at least one of a welding current and a welding voltage during the weaving of the leading electrode and the trailed electrode. The robot controller includes a leading-electrode processing section that calculates a leading-electrode changing amount on the basis of an electrical change of at least one of the welding current and the welding voltage of the leading electrode detected by the current/voltage detector, the leading-electrode changing amount corresponding to amounts of displacements of a weaving center trajectory of the welding torch in a left-right direction and an up-down direction with respect to the weld line; a leading-electrode correcting section that calculates a leading-electrode correction amount on the basis of the leading-electrode changing amount, the leading-electrode correction amount being used for correcting the displacements of the weaving center trajectory in the left-right direction and the up-down direction; a trailed-electrode processing section that calculates a trailed-electrode changing amount on the basis of an electrical change of one of the welding current and the welding voltage of the trailed electrode detected by the current/voltage detector, the trailed-electrode changing amount corresponding to an amount of displacement of the weaving center trajectory of the welding torch in a rotational direction with respect to the weld line; a trailed-electrode correcting section that calculates a trailed-electrode correction amount on the basis of the trailed-electrode changing amount, the trailed-electrode correction amount being used for correcting the displacement of the weaving center trajectory in the rotational direction; a rotational-displacement correction controlling processing section that, from a difference between a position of the leading electrode before performing the correction using the trailed-electrode correction amount and a position of the leading electrode after performing the correction using the trailed-electrode correction amount, calculates an amount of displacement of the leading electrode when the correction is performed using the trailed-electrode correction amount, and that, on the basis of the amount of displacement of the leading electrode, calculates a rotational-center correction amount used for correcting the displacement of the leading electrode; and a robot trajectory planning processing section that adds or subtracts the leading-electrode correction amount and the trailed-electrode correction amount, to correct a teaching position of a teaching trajectory that is previously calculated when the arc welding is performed, and that adds or subtracts the rotational-center correction amount to correct a position of a rotational center of the welding torch during tracking correction.

The robot controller having such a structure performs arc tracking that controls the welding torch in the left-right direction and the up-down direction with respect to the welding direction on the basis of the leading-electrode correction amount calculated by the leading-electrode correcting section, arc tracking that controls the welding torch in the rotational direction with respect to the welding direction on the basis of the trailed-electrode correction amount calculated by the trailed-electrode correcting section, and arc tracking that controls the position of the rotational center of the welding torch during tracking correction on the basis of the rotational-center correction amount calculated by the rotational-displacement correction controlling processing section.

Accordingly, by correcting the position of the rotational center of the welding torch during the tracking correction using the rotational-center correction amount in addition to the leading-electrode correction amount and the trailed-electrode correction amount, displacement of the leading electrode that occurs or that is expected to occur as a result of the arc tracking by the trailed electrode, that is, as a result of control of the rotational direction of the welding torch on the basis of the trailed-electrode correction amount calculated by the trailed-electrode correcting section, is corrected. Therefore, even when the arc tracking by the trailed electrode is performed at any rotational center, displacement of the leading electrode does not occur.

According to a second aspect of the present invention, there is provided an arc tracking controlling method using a robot controller that controls a position of a welding torch of a tandem arc welding system that performs arc welding while tracking a weld line. The method includes a leading-electrode controlling step in which displacements of a weaving center trajectory in a left-right direction and an up-down direction with respect to the weld line are detected, and the position of the welding torch is controlled in the left-right direction and the up-down direction with respect to a welding direction, to correct the displacements in the left-right direction and the up-down direction; a trailed-electrode controlling step in which a displacement of the weaving center trajectory in a rotational direction with respect to the weld line is detected, and the position of the welding torch is controlled in the rotational direction, to correct the displacement in the rotational direction; and a rotational-center controlling step in which a displacement of the leading electrode caused by correction of the trailed electrode in the trailed-electrode controlling step is detected, and a rotational center of the welding torch during tracking correction is controlled, to correct the displacement of the leading electrode.

In the arc tracking controlling method for performing such steps, the arc trackings that control the welding torch in the left-right direction, the up-down direction, and the rotational direction with respect to the welding direction and the arc tracking that controls the position of the rotational center of the welding torch are performed. Therefore, even when the arc tracking by the trailed electrode is performed at any rotational center, displacement of the leading electrode does not occur.

The arc tracking controlling method according to the present invention may have the following features. That is, the leading-electrode controlling step may include a leading-electrode changing amount calculating step in which a leading-electrode processing section calculates a leading-electrode first changing amount and a leading-electrode second changing amount from an electrical change of at least one of a welding current and a welding voltage in one weaving period, the leading-electrode first changing amount indicating the displacement of the weaving center trajectory in the left-right direction with respect to the weld line, the leading-electrode second changing amount indicating the displacement of the weaving center trajectory in the up-down direction with respect to the weld line; and a leading-electrode correction amount calculating step in which a leading-electrode correcting section calculates a leading-electrode left-right correction amount on the basis of the leading-electrode first changing amount, and calculates a leading-electrode up-down correction amount on the basis of the leading-electrode second changing amount, the leading-electrode left-right correction amount being used for correcting the displacement of the weaving center trajectory in the left-right direction, the leading-electrode up-down correction amount being used for correcting the displacement of the weaving center trajectory in the up-down direction. The trailed-electrode controlling step may include a trailed-electrode changing amount calculating step in which a trailed-electrode processing section calculates a trailed-electrode changing amount from an electrical change of at least one of a welding current and a welding voltage in the one weaving period, the trailed-electrode changing amount indicating the displacement of the weaving center trajectory with respect to the weld line; and a trailed-electrode correction amount calculating step in which a trailed-electrode correcting section calculates a trailed-electrode correction amount on the basis of the trailed-electrode changing amount, the trailed-electrode correction amount being used for correcting the displacement of the weaving center trajectory in the rotational direction with respect to the weld line. In the rotational-center controlling step, a rotational-displacement correction controlling processing section may calculate a rotational-center correction amount on the basis of the trailed-electrode correction amount, and control the rotational center of the welding torch during the tracking correction, the rotational-center correction amount being used for correcting the displacement of the leading electrode when the correction is performed using the trailed-electrode correction amount.

In the arc tracking controlling method for performing such steps, the arc tracking that controls the welding torch in the left-right direction and the up-down direction with respect to the welding direction on the basis of the leading-electrode correction amount calculated by the leading-electrode correcting section is carried out. In addition, the arc tracking that controls the welding torch in the rotational direction with respect to the welding direction on the basis of the trailed-electrode correction amount calculated by the trailed-electrode correcting section is carried out. Further, the arc tracking that controls the position of the rotational center of the welding torch on the basis of the rotational-center correction amount calculated by the rotational-displacement correction controlling processing section is carried out.

Accordingly, by correcting the position of the rotational center of the welding torch using the rotational-center correction amount in addition to the leading-electrode correction amount and the trailed-electrode correction amount, displacement of the leading electrode that occurs or that is expected to occur as a result of the arc tracking by the trailed electrode, that is, as a result of control of the rotational direction of the welding torch on the basis of the trailed-electrode correction amount calculated by the trailed-electrode correcting section, is corrected. Therefore, even when the arc tracking by the trailed electrode is performed at any rotational center, displacement of the leading electrode does not occur.

The arc tracking controlling method according to the present invention may have the following features. That is, the rotational-center controlling step may include a leading-electrode reference position calculating step in which a reference position of the leading electrode is calculated from a distance between the leading electrode and the rotational center of the welding torch when the tracking correction is performed and from torch orientation information indicating an orientation of the welding torch with reference to the robot; and a rotational-center correction amount calculating step in which the rotational-center correction amount is calculated from the reference position of the leading electrode and the trailed-electrode correction amount by determining a difference between a position of the leading electrode before performing the correction using the trailed-electrode correction amount and a position of the leading electrode after performing the correction using the trailed-electrode correction amount.

In the arc tracking controlling method for performing such steps, by using the distance between the leading electrode and the rotational center, torch orientation information, and the trailed-electrode correction amount, it is possible to easily calculate the rotational-center correction amount for correcting displacement of the leading electrode that occurs or that is expected to occur as a result of the control of the rotational direction of the welding torch on the basis of the trailed-electrode correction amount.

According to a third aspect of the present invention, there is provided a tandem arc welding system that performs arc welding along a weld line. The tandem arc welding system includes a welding torch having a leading electrode and a trailed electrode disposed apart from each other by a predetermined distance in a direction of the weld line; a robot having the welding torch mounted to an end thereof, the robot causing the welding torch to weave leftwards and rightwards with respect to a welding direction; a welding power supply that supplies electric power to the leading electrode and the trailed electrode; a current/voltage detector that detects at least one of a welding current and a welding voltage during the weaving of the leading electrode and the trailed electrode; and a robot controller that controls a position of the welding torch. The robot control includes a leading-electrode processing section that calculates a leading-electrode changing amount on the basis of an electrical change of at least one of the welding current and the welding voltage of the leading electrode detected by the current/voltage detector, the leading-electrode changing amount corresponding to amounts of displacements of a weaving center trajectory of the welding torch in a left-right direction and an up-down direction with respect to the weld line; a leading-electrode correcting section that calculates a leading-electrode correction amount on the basis of the leading-electrode changing amount, the leading-electrode correction amount being used for correcting the displacements of the weaving center trajectory in the left-right direction and the up-down direction; a trailed-electrode processing section that calculates a trailed-electrode changing amount on the basis of an electrical change of one of the welding current and the welding voltage of the trailed electrode detected by the current/voltage detector, the trailed-electrode changing amount corresponding to an amount of displacement of the weaving center trajectory of the welding torch in a rotational direction with respect to the weld line; a trailed-electrode correcting section that calculates a trailed-electrode correction amount on the basis of the trailed-electrode changing amount, the trailed-electrode correction amount being used for correcting the displacement of the weaving center trajectory in the rotational direction; a rotational-displacement correction controlling processing section that, from a difference between a position of the leading electrode before performing the correction using the trailed-electrode correction amount and a position of the leading electrode after performing the correction using the trailed-electrode correction amount, calculates an amount of displacement of the leading electrode when the correction is performed using the trailed-electrode correction amount, and that, on the basis of the amount of displacement of the leading electrode, calculates a rotational-center correction amount used for correcting the displacement of the leading electrode; and a robot trajectory planning processing section that adds or subtracts the leading-electrode correction amount and the trailed-electrode correction amount, to correct a teaching position of a teaching trajectory that is previously calculated when the arc welding is performed, and that adds or subtracts the rotational-center correction amount to correct a position of a rotational center of the welding torch during tracking correction.

The tandem arc welding system having such a structure performs arc tracking that controls the welding torch in the left-right direction and the up-down direction with respect to the welding direction on the basis of the leading-electrode correction amount calculated by the leading-electrode correcting section of the robot controller, arc tracking that controls the welding torch in the rotational direction with respect to the welding direction on the basis of the trailed-electrode correction amount calculated by the trailed-electrode correcting section of the robot controller, and arc tracking that controls the position of the rotational center of the welding torch during tracking correction on the basis of the rotational-center correction amount calculated by the rotational-displacement correction controlling processing section of the robot controller.

Accordingly, by correcting the position of the rotational center of the welding torch during tracking correction using the rotational-center correction amount in addition to the leading-electrode correction amount and the trailed-electrode correction amount, displacement of the leading electrode that occurs or that is expected to occur as a result of the arc tracking by the trailed electrode, that is, control of the rotational direction of the welding torch on the basis of the trailed-electrode correction amount calculated by the trailed-electrode correcting section, is corrected. Therefore, even when the arc tracking by the trailed electrode is performed at any rotational center, displacement of the leading electrode does not occur.

According to the robot controller and the tandem arc welding system of the present invention, even when arc tracking carried out during arc welding is performed at any rotational center between the leading electrode and the trailed electrode, displacement of the leading electrode does not occur, thereby making it possible to properly prevent defective welding caused by displacement of the leading electrode. According to the arc tracking controlling method of the present invention, the welding torch is controlled in the left-right direction, the up-down direction, and the rotational direction by carrying out the aforementioned steps, and the rotational center of the welding torch carried out during tracking correction is controlled. Therefore, displacement of the leading electrode when the arc tracking during the arc welding is performed at any rotational center between the leading electrode and the trailed electrode can be properly corrected.

DESCRIPTION OF THE PREFERRED EMBODIMENTS

Robot Controller

A robot controller that controls a tandem arc welding system according to an embodiment of the present invention will hereunder be described in detail with reference to the drawings. First, the tandem arc welding system including the robot controller according to the present invention performs arc welding so as to track a weld line while two electrodes perform weaving in a welding direction of a welding workpiece. As shown in FIG. 9B, the tandem arc welding system may perform arc welding by changing an operation direction to the opposite direction without changing a teaching position.

Figure 1:
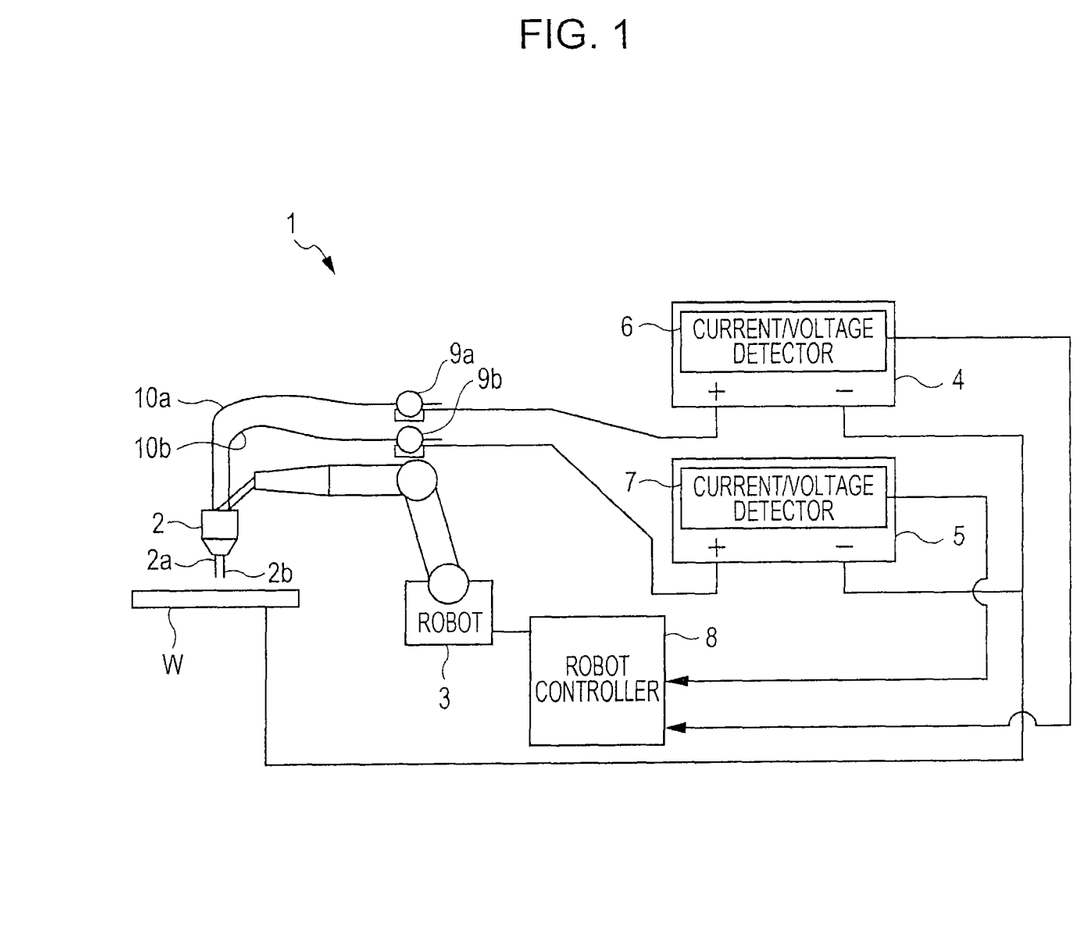
FIG. 1 illustrates the structure of an exemplary tandem arc welding system.

As shown in FIG. 1, the tandem arc welding system 1 primarily includes, in addition to a robot controller 8, a welding torch 2, a robot 3, welding power supplies 4 and 5, and current/voltage detectors 6 and 7. The welding torch 2 includes a leading electrode 2a and a trailed electrode 2b. Each part will hereunder be described.

The leading electrode 2a is disposed at an end of the welding torch 2 towards the front in a welding direction of a welding workpiece W. The trailed electrode 2b is disposed apart from the leading electrode 2a by a predetermined distance (such as 10 to 30 mm) and towards the rear in the welding direction. The leading electrode 2a and the trailed electrode 2b operate as consumable electrodes. Welding wires 10a and 10b are inserted into a tubular leading-electrode torch and a tubular trailed-electrode torch (not shown). It is desirable that the welding wires 10a and 10b protrude from ends of the respective torches by a predetermined protruding length (such as 20 to 35 mm). The welding wires 10a and 10b are supplied from feeding motors 9a and 9b, respectively. For the welding wires 10a and 10b, wires having predetermined compositions are selected as required on the basis of, for example, the welding type and the material of the welding workpiece W. Exemplary wires are those that contain, for example, a predetermined amount of C, Si, Mn, Ti, S, and O in one part and contain Fe and inevitable impurities in the remaining part.

The welding torch 2 may include a shield gas nozzle. As a shield gas, a gas composition that is rich in inert gases, such as $Ar+CO_2$, $Ar+He+O$, and $Ar+He+CO_2$, is used.

Figure 3:
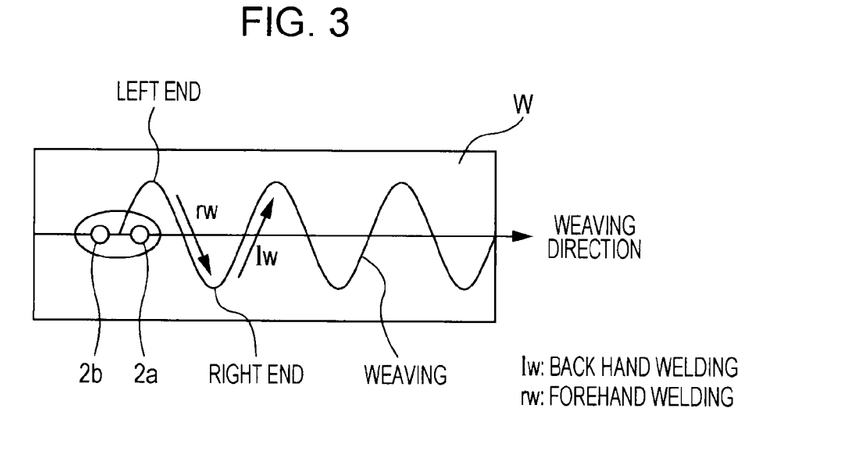
FIG. 3 illustrates a weaving state of a welding torch of the tandem arc welding system.

As shown in FIG. 3, the robot 3 has the welding torch 2 mounted to one end thereof, and causes the welding torch 2 to perform weaving in the left-right direction with respect to the welding direction when carrying out arc welding. The weaving is controlled by driving each axis of the robot 3. The control is performed by the robot controller 8 (described later).

The welding power supplies 4 and 5 supply electric power to the leading electrode 2a, the trailed electrode 2b, and the welding workpiece W, to generate an arc between the leading electrode 2a and the welding workpiece W and between the trailed electrode 2b and the welding workpiece W.

The current/voltage detectors 6 and 7 detect welding amounts at predetermined locations, such as at left and right ends of weaving, during the weaving of the leading electrode 2a and the trailed electrode 2b. Here, the welding amounts indicate welding currents and/or welding voltages of the leading electrode 2a or the trailed electrode 2b detected by the respective current/voltage detectors 6 and 7. Although, in FIG. 1, the current/voltage detectors 6 and 7 are provided in the respective welding power supplies 4 and 5, the current/voltage detectors 6 and 7 may be provided outside the respective welding power supplies 4 and 5.

The robot controller 8 controls the position of the welding torch 2 of the tandem arc welding system 1. The robot controller 8 controls the position of the welding torch 2 using the robot 3 on the basis of the welding amounts detected by the current/voltage detectors 6 and 7. More specifically, as described later, the robot controller 8 corrects a position of a weaving center trajectory in the left-right direction and the up-down direction using a leading-electrode correction amount (which is a correction amount calculated from electrical changes of the welding amounts of the leading electrode 2a), and corrects a position of the weaving center trajectory in a rotational direction using a trailed-electrode correction amount (which is a correction amount calculated from electrical changes of the welding amounts of the trailed electrode 2b). As described later, the robot controller 8 corrects the rotational center of the welding torch 2 during tracking correction using a rotational-center correction amount calculated from, for example, the trailed-electrode correction amount.

Figure 2:
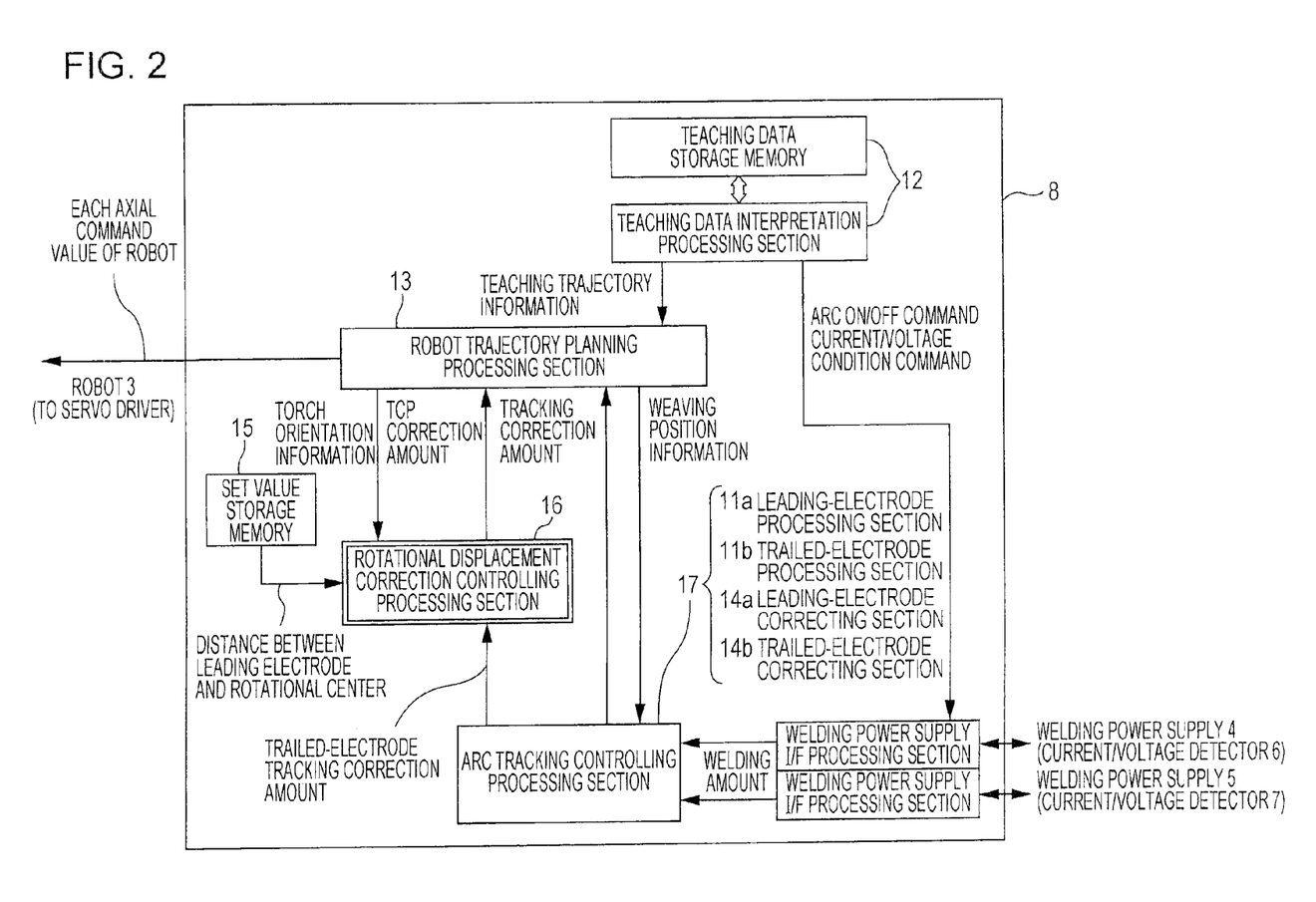
FIG. 2 is a block diagram of a robot controller according to the present invention that controls the tandem arc welding system.

As shown in FIG. 2, the robot controller 8 includes a leading-electrode processing section 11a, a leading-electrode correcting section 14a, a trailed-electrode processing section 11b, a trailed-electrode correcting section 14d, a set value storage memory 15, a rotational-displacement correction controlling processing section 16, and an arc tracking controlling processing section 17. Each structure will be described below.

The leading-electrode processing section 11a calculates a leading-electrode changing amount on the basis of the electrical changes of the welding amounts of the leading electrode 2a detected by the current/voltage detectors 6 and 7. The leading-electrode changing amount corresponds to the amounts of displacements of the weaving center trajectory of the welding torch 2 in the left-right direction and the up-down direction with respect to a weld line. The trailed-electrode processing section 11b calculates a trailed-electrode changing amount on the basis of the electrical changes of the welding amounts of the trailed electrode 2b detected by the current/voltage detectors 6 and 7. The trailed-electrode changing amounts correspond to the amounts of displacement of the weaving center trajectory of the welding torch 2 in the rotational direction with respect to the weld line.

In the leading-electrode processing section 11a and the trailed-electrode processing section 11b, the electrical changes of the welding amounts are calculated on the basis of weaving position information from a robot trajectory planning processing section 13, such as the left end or the right end of weaving, or back hand welding or forehand welding. The calculation is carried out using a predetermined calculation method from data regarding the welding amounts detected by the current/voltage detectors 6 and 7 at positions indicated by the information, such as a method of calculating the difference between the welding amounts at the respective positions (discussed below). Here, electrical changing amounts of the welding amounts refer to displacement amounts of the weaving trajectory with respect to the weld line.

The leading-electrode correcting section 14a calculates the leading-electrode correction amount on the basis of the leading-electrode changing amount calculated at the leading-electrode processing section 11a. The leading-electrode correction amount is used for correcting the displacements of the weaving center trajectory in the left-right direction and the up-down direction. The trailed-electrode correcting section 14b calculates the trailed-electrode correction amount on the basis of the trailed-electrode changing amount calculated at the trailed-electrode processing section 11b. The trailed-electrode correction amount is used for correcting the displacement of the weaving center trajectory in the rotational direction.

In the leading-electrode correcting section 14a and the trailed-electrode correcting section 14b, tracking correction amounts are calculated on the basis of the electrical changes of the welding amounts calculated at the leading-electrode processing section 11a and the trailed-electrode processing section 11b. The calculation is performed by a predetermined calculation method, such as a calculating method making use of a proportionality (discussed below) or a calculating method making use of a threshold value. The tracking correction amounts are used for controlling the displacements of the weaving center trajectory in the left-right direction, the up-down direction, and the rotational direction with respect to the weld line. More specifically, the leading-electrode correcting section 14a calculates the leading-electrode correction amount, which is the tracking correction amount of the leading electrode 2a, and the trailed-electrode correcting section 14b calculates the trailed-electrode correction amount, which is the tracking correction amount of the trailed electrode 2b. Then, as shown in FIG. 2, each calculated correction amount is sent to the robot trajectory planning processing section 13. As shown in FIG. 2, the trailed-electrode correction amount calculated by the trailed-electrode correcting section 14b is sent to the rotational-displacement correction controlling processing section 16.

The set value storage memory 15 previously stores the distance between the leading electrode 2a of the welding torch 2 and the rotational center of the welding torch 2 during tracking correction. As shown in FIG. 2, the distance between the leading electrode 2a and the rotational center is sent to the rotational-displacement correction controlling processing section 16. More specifically, the distance between the leading electrode 2a and the rotational center corresponds to data in which the distance between the leading electrode 2a and the rotational center of the welding torch 2 in a tool coordinate system corresponding to a coordinate system of the welding torch 2 is represented by a vector.

The rotational-displacement correction controlling processing section 16 calculates the rotational-center correction amount, that is, a TCP correction amount from the trailed-electrode correction amount, the distance between the leading electrode 2a and the rotational center, and torch orientation information. Here, the torch orientation information refers to information that indicates the orientation of the welding torch 2 with reference to the robot 3. More specifically, the torch orientation information corresponds to a rotating matrix for changing the tool coordinate system, which corresponds to the coordinate system of the welding torch 2, to a robot coordinate system, which corresponds to a coordinate system of the robot 3. As shown in FIG. 2, the torch orientation information is sent from the robot trajectory planning processing section 13 (described later) to the rotational-displacement correction controlling processing section 16. Then, as shown in FIG. 2, the rotational-center correction amount calculated by the rotational-displacement correction controlling processing section 16 is sent to the robot trajectory planning processing section 13.

The rotational-displacement correction controlling processing section 16 calculates a displacement amount of the leading electrode 2a when correction is performed using the trailed-electrode correction amount from a difference between the position of the leading electrode 2a before performing the correction using the trailed-electrode correction amount and the position of the leading electrode 2a after performing the correction using the trailed-electrode correction amount. Then, on the basis of the displacement amount of the leading electrode 2a, the rotational-displacement correction controlling processing section 16 calculates the rotational-center correction amount for correcting the displacement of the leading electrode 2a. Specific steps for calculating the rotational-center correction amount will hereunder be described.

The arc tracking controlling processing section 17 controls arc tracking in the tandem arc welding system. As mentioned above, the arc tracking controlling processing section 17 includes the leading-electrode processing section 11a, the trailed-electrode processing section 11b, the leading-electrode correcting section 14a, and the trailed-electrode correcting section 14b.

The robot trajectory planning processing section 13 adds or subtracts the leading-electrode correction amount that is sent from the leading-electrode correcting section 14a and the trailed-electrode correction amount that is sent from the trailed-electrode correcting section 14b, to correct teaching position data that is sent from a teaching data section 12.

Here, the teaching position data corresponds to data that indicates a teaching position of a teaching trajectory that is previously calculated when performing arc welding.

The robot trajectory planning processing section 13 adds or subtracts the rotational-center correction amount that is sent from the rotational-displacement correction controlling processing section 16, to correct rotational-center data of the welding torch 2. Here, the rotational-center data corresponds to data that indicates the position of the rotational center of the welding torch 2 during tracking correction.

Figure 4:
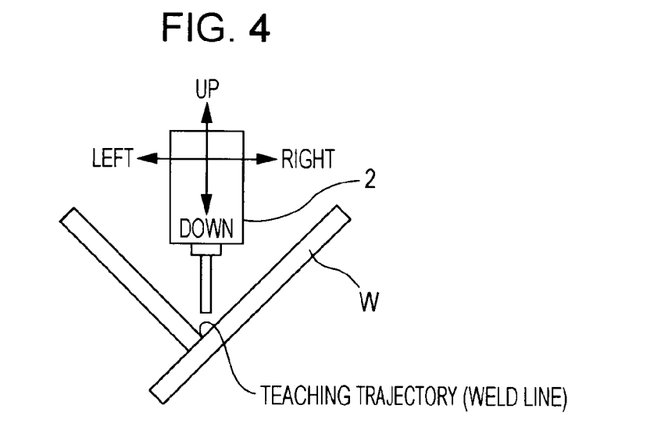
FIG. 4 illustrates an arc tracking state using the robot controller according to the present invention.
Figure 5:
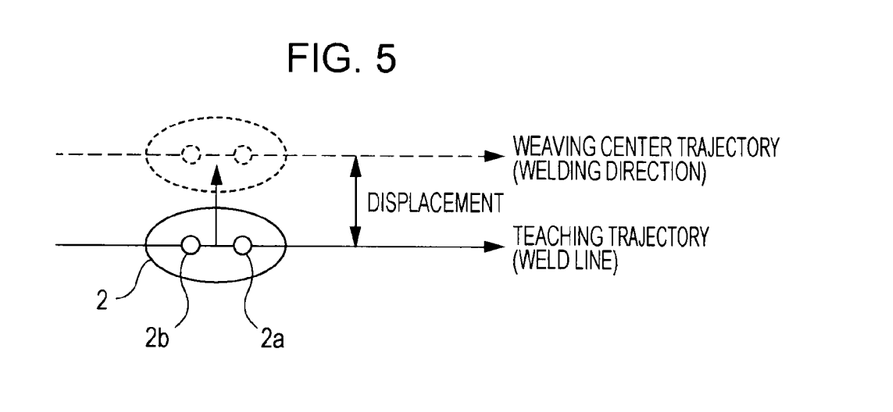
FIG. 5 illustrates an arc tracking state in a left-right direction using the robot controller according to the present invention.
Figure 6:
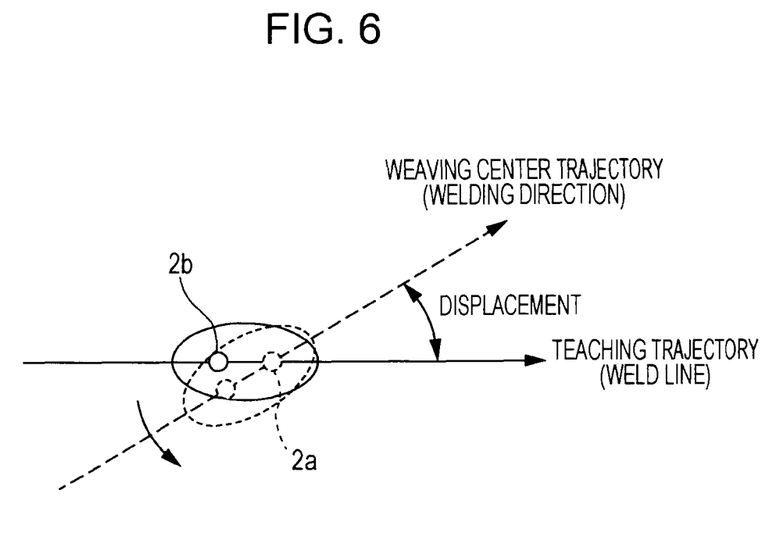
FIG. 6 illustrates an arc tracking state in a rotational direction using the robot controller according to the present invention.

The robot trajectory planning processing section 13 sends these corrected pieces of data as respective axial command values of the robot 3 to a servo driver of the robot 3. As a result, the robot trajectory planning processing section 13 controls the welding torch 2 (mounted to an end of the robot 3) in the left-right direction, the up-down direction, and the rotational direction with respect to the welding direction as shown in FIGS. 4 to 6; and controls the rotational center of the welding torch 2 during tracking correction as shown in FIG. 7.

Here, in the tandem arc welding system 1 according to the present invention, welding current is used as a welding amount used in correcting the displacement of the weaving center trajectory in the up-down direction. As a welding amount used in correcting the displacement of the weaving center trajectory in the left-right direction, a welding current or a welding voltage is used. In this case, if the responsiveness of control of constant voltages of the welding power supplies 4 and 5 is quick with respect to a weaving period, the welding current is used. In contrast, if the responsiveness is slow, the welding voltage is used. The welding current and the welding voltage may both be used.

Arc Tracking Controlling Method

Next, an arc tracking controlling method using the robot controller 8 according to the present invention will be described in detail. The arc tracking controlling method according to the present invention includes a leading-electrode controlling step, a trailed-electrode controlling step, and a rotational-center controlling step. Here, the trailed-electrode controlling step, the leading-electrode controlling step, and the rotational-center controlling step may be performed at the same time or may be performed sequentially in that order.

(1) Leading-Electrode Controlling Step

It is desirable that the leading-electrode controlling step include a leading-electrode changing amount calculating step and a leading-electrode correction amount calculating step.

In the leading-electrode changing amount calculating step, the leading-electrode processing section 11a calculates a leading-electrode first changing amount and a leading-electrode second changing amount by a predetermined calculating method from electrical changes in welding amounts, that is, the welding currents and/or the welding voltages, in one weaving period. The leading-electrode first changing amount indicates the displacement of the weaving center trajectory in the left-right direction with respect to the weld line. The leading-electrode second changing amount indicates the displacement of the weaving center trajectory in the up-down direction with respect to the weld line.

Method of Calculating Leading-Electrode First Changing Amount

It is desirable that the leading-electrode first changing amount be calculated by either one of the following two calculating methods.

In the first calculating method, as expressed in the following Formula (1), the leading-electrode first changing amount (dI_Lrl) is the difference between a left-end welding amount (L_A) of the leading electrode 2a detected at a left end of weaving and a right-end welding amount (L_B) of the leading electrode 2a detected at a right end of weaving.

$$[dI\_Lrl]=[L\_B]-[L\_A] \quad (1)$$

In the second calculating method, as expressed in the following Formula (2), the leading-electrode first changing amount (dI_Lrl) is the difference between a first welding amount difference and a second welding amount difference. The first welding amount difference is defined as a difference between a maximum back hand welding amount (L_lmax) of the leading electrode 2a and a minimum back hand welding amount (L_lmin) of the leading electrode 2a. The maximum back hand welding amount (L_lmax) and the minimum back hand welding amount (L_lmin) are detected during a period of a back hand weaving rw (see FIG. 3) from the left end to the right end of the weaving. The second welding amount difference is defined as a difference between a maximum forehand welding amount (L_rmax) of the leading electrode 2a and a minimum forehand welding amount (L_rmin) of the leading electrode 2a. The maximum forehand welding amount (L_rmax) and the minimum forehand welding amount (L_rmin) are detected during a period of a forehand weaving lw (see FIG. 3) from the right end to the left end of the weaving.

$$[dI\_Lrl]=([L\_lmax]-[L\_lmin])-([L\_rmax]-[L\_rmin]) \quad (2)$$

Method of Calculating Leading-Electrode Second Changing Amount

It is desirable that a leading-electrode second changing amount (dI_Lud) be calculated by a calculating method using the following Formula (3). That is, the welding amount is the welding current value, and is a difference between an average welding current value of the leading electrode 2a and a previously set reference welding current value. The average welding current value is detected during one weaving period. In the following Formula (3), the average welding current value is the average of four welding current values, that is, the maximum welding current values and minimum welding current values (L_lmax, L_lmin, L_rmax, L_rmin) detected during the period of back hand weaving and during the period of forehand weaving. However, the number of detection points is not limited to 4. Considering the tracking precision or a reduction in information processing time, it is possible to increase or decrease the number of detection points.

$$[dI\_Lud]=[\text{reference welding current value}]-[\text{average welding current value}] \quad (3)$$

$$[\text{average welding current value}]=([L\_lmax]+[L\_lmin]+[L\_rmax]+[L\_rmin])/4$$

In the leading-electrode correction amount calculating step, using a predetermined calculating method, the aforementioned leading-electrode correcting section 14a calculates a leading-electrode left-right correction amount on the basis of the leading-electrode first changing amount, and calculates a leading-electrode up-down correction amount on the basis of the leading-electrode second changing amount. The leading-electrode left-right correction amount is used for correcting the displacement of the weaving center trajectory in the left-right direction. The leading-electrode up-down correction amount is used for correcting the displacement of the weaving center trajectory in the up-down direction.

Method of Calculating Leading-Electrode Left-Right Correction Amount

It is desirable that, using a calculating method using the following Formula (4), the leading-electrode left-right correction amount (U_Lrl) be calculated on the basis of the leading-electrode first changing amount (dI_Lrl) calculated using the Formula (1) or the Formula (2). Here, (k_Lrl) is a constant.

$$[U\_Lrl]=[k\_Lrl] \times [dI\_Lrl] \qquad (4)$$

That is, as the leading-electrode left-right correction amount (U_Lrl), a correction amount that is proportional to the leading-electrode first changing amount (dI_Lrl) is used.

Method of Calculating Leading-Electrode Up-Down Correction Amount

It is desirable that, using a calculating method using the following Formula (5), the leading-electrode up-down correction amount (U_Lud) be calculated on the basis of the leading-electrode second changing amount (dI_Lud) calculated using the Formula (3).

$$[U\_Lud]=[k\_Lud] \times [dI\_Lud] \qquad (5)$$

That is, as the leading-electrode up-down correction amount (U_Lud), a correction amount that is proportional to the leading-electrode second changing amount (dI_Lud) is used.

The methods of calculating the leading-electrode left-right correction amount and the leading-electrode up-down correction amount in the Formulas (4) and (5) are methods of calculating correction amounts that are proportional to the leading-electrode first changing amount and the leading-electrode second changing amount. However, as shown below, in addition to the proportionals, integrations ([ki_Lrl]×Σ[dI_Lrl], [ki_Lud]×Σ[dI_Lud]) may also be added. This makes it possible to further reduce deviations of the displacement of the weaving center trajectory.

$$[U\_Lrl]=[k\_Lrl] \times [dI\_Lrl]+[ki\_Lrl] \times \Sigma [dI\_Lrl]$$

$$[U\_Lud]=[k\_Lud] \times [dI\_Lud]+[ki\_Lud] \times \Sigma [dI\_Lud]$$

Using the leading-electrode left-right correction amount and the leading-electrode up-down correction amount calculated in this way, the welding torch 2 of the tandem arc welding system 1 is controlled in the left-right direction and the up-down direction with respect to the welding direction (see FIGS. 4 and 5).

(2) Trailed-Electrode Controlling Step

It is desirable that the trailed-electrode controlling step include a trailed-electrode changing amount calculating step and a trailed-electrode correction amount calculating step.

In the trailed-electrode changing amount calculating step, the trailed-electrode processing section 11b calculates a trailed-electrode changing amount by a predetermined calculating method from electrical changes in welding amounts, that is, the welding current and/or the welding voltage, in one weaving period. The trailed-electrode changing amount indicates the displacement of the weaving center trajectory in the rotational direction with respect to the weld line.

Method of Calculating Trailed-Electrode Changing Amount

It is desirable that the trailed-electrode changing amount be calculated by either one of the following two calculating methods.

In the first calculating method, as expressed in the following Formula (6), the trailed-electrode changing amount (dI_Trl) is the difference between a left-end welding amount (T_A) of the trailed electrode 2b detected at the left end of weaving and a right-end welding amount (T_B) of the trailed electrode 2b detected at the right end of weaving.

$$[dI\_Trl]=[T\_B]-[T\_A] \qquad (6)$$

In the second calculating method, as expressed in the following Formula (7), the trailed-electrode changing amount (dI_Trl) is the difference between a third welding amount difference and a fourth welding amount difference. The third welding amount difference is defined as the difference between a maximum back hand welding amount (T_lmax) of the leading electrode 2a and a minimum back hand welding amount (T_lmin) of the leading electrode 2a. The maximum back hand welding amount (T_lmax) and the minimum back hand welding amount (T_lmin) are detected during a period of the back hand weaving rw (see FIG. 3) from the left end to the right end of the weaving. The fourth welding amount difference is defined as the difference between a maximum forehand welding amount (T_rmax) of the leading electrode 2a and a minimum forehand welding amount (T_rmin) of the leading electrode 2a. The maximum forehand welding amount (T_rmax) and the minimum forehand welding amount (T_rmin) are detected during a period of the forehand weaving lw (see FIG. 3) from the right end to the left end of the weaving.

$$[dI\_Trl]=([T\_lmax]-[T\_lmin])-([T\_rmax]-[T\_rmin]) \qquad (7)$$

In the trailed-electrode correction amount calculating step, using a predetermined calculating method, the aforementioned trailed-electrode correcting section 14b calculates the trailed-electrode correction amount on the basis of the trailed-electrode changing amount. The trailed-electrode correction amount is used for correcting the displacement of the weaving center trajectory in the rotational direction with respect to the weld line.

Method of Calculating Trailed-Electrode Correction Amount

It is desirable that the trailed-electrode correction amount (U_Trl) be determined on the basis of the following Conditional Expression (8). That is, the trailed-electrode correction amount (U_Trl) is set to zero until the trailed-electrode changing amount (dI_Trl) calculated using the aforementioned Formula (6) or Formula (7) exceeds a predetermined threshold value (±ΔI), and is set to a predetermined amount (±ΔU) when the trailed-electrode changing amount (dI_Trl) exceeds the threshold value (±ΔI).

when [dI_Trl]>ΔI, [U_Trl]=ΔU, when −ΔI≤[dI_Trl]≤ΔI, [U_Trl]=0 when [dI_Trl]<−ΔI, [U_Trl]=−ΔU     Conditional Expression (8)

The trailed-electrode correction amount (U_Trl) may be calculated as a correction amount that is proportional to the trailed-electrode changing amount (dI_Trl) as in the leading-electrode controlling step. That is, the trailed-electrode correction amount (U_Trl) may be calculated using the following Formula (9). Here, [K_Trl] is a constant.

$$[U\_Trl]=[k\_Trl] \times [dI\_Trl] \qquad (9)$$

Using the trailed-electrode correction amount calculated in this way, the welding torch 2 is controlled in the rotational direction with respect to the welding direction (see FIG. 6). Such control in the rotational direction is performed using any position between the leading electrode 2a and the trailed electrode 2b of the welding torch 2 as the rotational center.

(3) Rotational Center Controlling Step

In the rotational center controlling step, the rotational-displacement correction controlling processing section 16 calculates the rotational-center correction amount on the basis of the trailed-electrode correction amount, to control the rotational center of the welding torch 2 during tracking correction (see FIG. 7). The rotational-center correction amount is used for correcting displacement of the leading electrode 2a when correction is performed using the trailed-electrode correction amount.

It is desirable that the rotational-center controlling step include a leading-electrode reference position calculating step and a rotational-center correction amount calculating step.

In the leading-electrode reference position calculating step, a reference position of the leading electrode 2a is calculated from the distance between the leading electrode 2a and the rotational center of the welding torch 2 when tracking correction is performed and from the torch orientation information indicating the orientation of the welding torch 2 with reference to the robot 3.

In the rotational-center correction amount calculating step, the rotational-center correction amount is calculated from the trailed-electrode correction amount and the reference position of the leading electrode 2a by determining the difference between the position of the leading electrode 2a before performing the correction using the trailed-electrode correction amount and the position of the leading electrode 2a after performing the correction using the trailed-electrode correction amount.

Method of Calculating Rotational-Center Correction Amount

More specifically, it is desirable that the rotational-center correction amount ($\Delta$tcp) be calculated by the following calculating method. The following calculating method is a calculating method when TCP (which is the rotational center) is set at an intermediate position between the leading electrode 2a and the trailed electrode 2b, and when the trailed-electrode correction amount is for rotation in a same plane.

Figure 7A:
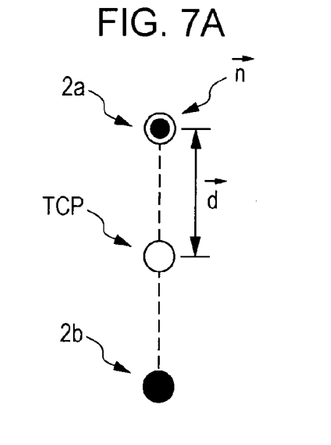
FIGS. 7A to 7E illustrate exemplary specific calculation steps of calculating a rotational-center correction amount using the robot controller according to the present invention.

First, using the following Formula (10), the vector from the leading electrode 2a to the rotational center is converted from that in the tool coordinate system to that in the robot coordinate system, and, as shown in FIG. 7A, a reference leading-electrode position vector (n) serving as a reference is calculated. Here, ($^{R}R_{T}$) in the following Formula (10) is the aforementioned torch orientation information, and is a rotating matrix for converting from the tool coordinate system into the robot coordinate system. A vector (d) in the following Formula (10) is the distance between the leading electrode and the rotational center, and is a vector from the leading electrode 2a to the rotational center of the welding torch 2 on the tool coordinate system.

$$\vec{n} = {}^{R}R_{T} \cdot \vec{d} \quad (10)$$

Figure 7B:
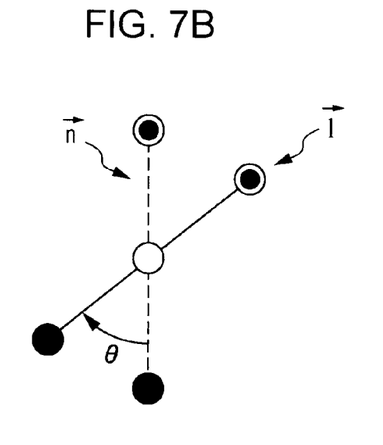

Next, using the following Formula (11), the reference leading-electrode position vector (n) is rotated by $\theta$ ($\alpha$, $\beta=0$, $\gamma=0$) by the rotating matrix ($^{R}R_{T}$), and, as shown in FIG. 7B, a current leading-electrode position vector (l) is calculated. The $\theta$ is an integration value of a trailed-electrode tracking correction amount ($\alpha$: roll, $\beta$: pitch, $\gamma$: yaw). The current leading-electrode position vector (l) is a vector of the position of the leading electrode 2a when starting arc welding.

$$\vec{l} = R_{\alpha} \cdot \vec{n} \quad (11)$$

Figure 7C:
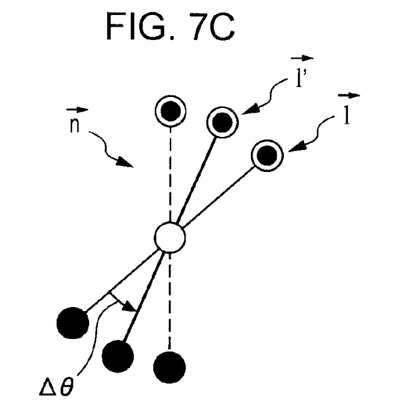

Next, using the following Formula (12), the reference leading-electrode position vector (n) is rotated by $\theta + \Delta\theta(\alpha + \Delta\alpha$, $\beta + \Delta\beta = 0$, $\gamma + \Delta\gamma = 0$) by a rotating matrix ($R_{\alpha + \Delta\alpha}$), and, as shown in FIG. 7C, a leading-electrode position vector (l') after tracking correction is calculated. The $\Delta\theta$ is a current trailed-electrode tracking correction amount ($\Delta\alpha$: roll, $\Delta\beta$: pitch, $\Delta\gamma$: yaw).

$$\vec{l}' = R_{\alpha + \Delta\alpha} \cdot \vec{n} \quad (12)$$

Figure 7D:
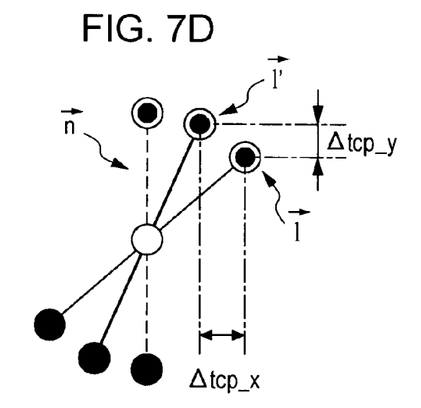

Next, using the following Formula (13), the difference between the current leading-electrode position vector (l) and the leading-electrode position vector (l') after the tracking correction is determined, and, as shown in FIG. 7D, the rotational-center correction amount ($\Delta$tcp) is calculated. The leading-electrode position vector (l) indicates the position of the leading electrode 2a before performing the correction using the trailed-electrode correction amount, whereas the leading-electrode position vector (l') indicates the position of the leading electrode 2a after performing the correction using the trailed-electrode correction amount.

$$\Delta\text{tcp} = \vec{l} - \vec{l}' \quad (13)$$

Figure 7E:
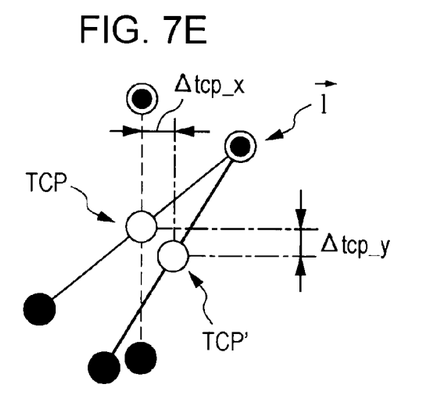

Next, using the following Formula (14), the rotational-center correction amount ($\Delta$tcp) is added to the current rotational center (TCP), and, as shown in FIG. 7E, a target rotational center (TCP') is calculated.

$$TCP' = TCP + \Delta\text{tcp} \quad (14)$$

Here, the calculation of the rotational-center correction amount ($\Delta$tcp) using the aforementioned Formulas (10) to (13) is carried out at the rotational-displacement correction controlling processing section 16 of the aforementioned robot controller 8. The calculation of the target rotational center (TCP') using the aforementioned Formula (14) is carried out at the robot trajectory planning processing section 13 of the aforementioned robot controller 8.

Next, the flow of the arc tracking controlling method will be described with reference to FIGS. 1, 2, 7A to 7E, and 8. The welding currents are used as the welding amounts. With regard to Steps 1 to 12 (S1 to S12), the following are exemplary conditions. That is, the leading-electrode controlling step and the trailed-electrode controlling step are considered as being the same; the leading-electrode controlling step, the trailed-electrode controlling step, and the rotational-center controlling step are carried out at the same time; the calculations of the leading-electrode first changing amount and the trailed-electrode changing amount are carried out using the second calculating method; the calculations of the leading-electrode left-right correction amount and the leading-electrode up-down correction amount are carried out using a proportionality; the calculation of the trailed-electrode correction amount is carried out using a threshold value; and the calculation of the rotational-center correction amount is carried out using the above-described calculating method.

Figure 8:
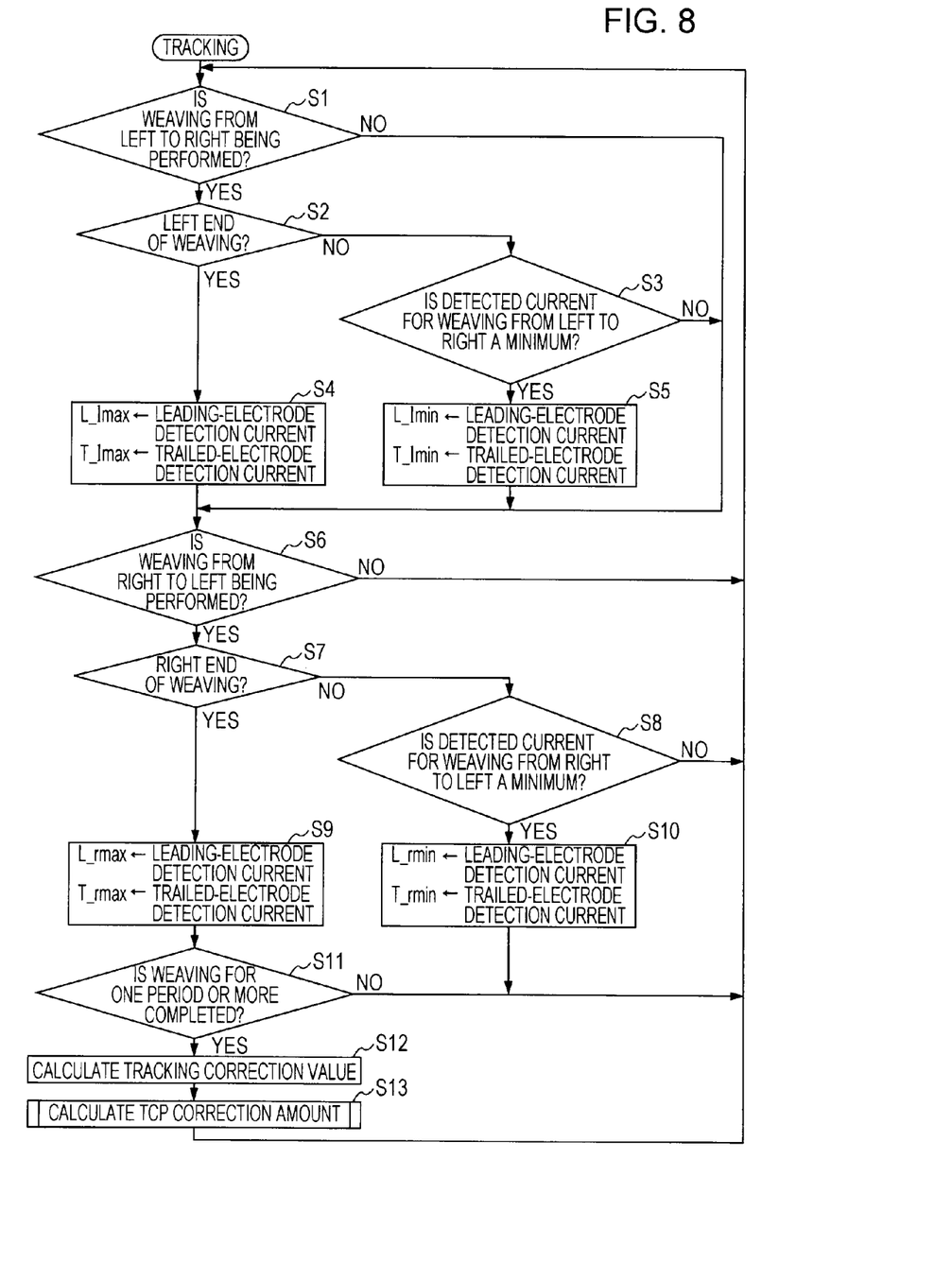
FIG. 8 is a flowchart illustrating an arc tracking controlling method using the robot controller according to the present invention.

(1) In Steps 1 to 6 (S1 to S6), from the welding amounts detected by the current/voltage detectors 6 and 7, the leading-electrode processing section 11a and the trailed-electrode processing section 11b extract the maximum back hand welding amount of the leading electrode 2a and that of the trailed electrode 2b (L_lmax, T_lmax) and the minimum back hand welding amount of the leading electrode 2a and that of the trailed electrode 2b (L_lmin, T_lmin) during the back hand weaving period. Since the welding currents are used as the welding amounts, the leading-electrode detection current and the trailed-electrode detection current detected at the left end of the weaving become the maximum back hand welding amounts (L_lmax, T_lmax).

(2) As in the previous steps, in Steps 7 to 11 (S7 to S11), from the welding amounts detected by the current/voltage detectors 6 and 7, the maximum forehand welding amount of the leading electrode 2a and that of the trailed electrode 2b (L_rmax, T_rmax) and the minimum forehand welding amount of the leading electrode 2a and that of the trailed electrode 2b (L_rmin, T_rmin) during the forehand weaving period are extracted. Since the welding currents are used as the welding amounts, the leading-electrode detection current and the trailed-electrode detection current detected at the right end of the weaving become the maximum forehand welding amounts (L_rmax, T_rmax).

(3) In Step 12 (S12), from the maximum back hand welding amounts (L_lmax, T_lmax), the minimum back hand welding amounts (L_lmin, T_lmin), the maximum forehand welding amounts (L_rmax, T_rmax), and the minimum forehand welding amounts (L_rmin, T_rmin), the leading-electrode processing section 11a and the trailed-electrode processing section 11b calculate the leading-electrode first changing amount (dI_Lrl) using the aforementioned Formula (2), and the trailed-electrode changing amount (dI_Trl) using the aforementioned Formula (7). In addition, using the welding current values as the welding amounts, from the maximum back hand welding amounts (maximum back hand welding currents) (L_lmax, T_lmax), the minimum back hand welding amounts (minimum back hand welding current values) (L_lmin, T_lmin), the maximum forehand welding amounts (maximum forehand welding current values) (L_rmax, T_rmax), and the minimum forehand welding amounts (minimum forehand welding current values) (L_rmin, T_rmin), the average welding amount (average welding current value) is calculated. In addition, along with the reference welding amount (reference welding current value) previously stored in the leading-electrode processing section 11a, the leading-electrode second changing amount (dI_Lud) is calculated using the aforementioned Formula (3).

The leading electrode correcting section 14a calculates the leading-electrode left-right correction amount (U_Lrl) using Formula (4) from the leading-electrode first changing amount (dI_Lrl) and the leading-electrode up-down correction amount (U_Lud) using Formula (5) from the leading-electrode second changing amount. The trailed-electrode correcting section 14b calculates the trailed-electrode correction amount (U_Trl) using Conditional Expression (8) from the trailed electrode changing amount (dI_Trl).

(4) In Step 13 (S13), the rotational-displacement correction controlling processing section 16 calculates the rotational-center correction amount (Δtcp) using the Formulas (10) to (13) from the trailed-electrode correction amount, the distance between the leading electrode and the rotational center, and the torch orientation information.

The calculated correction amounts (U_Lrl, U_Lud, U_Trl, Δtcp) are sent to the robot 3 through the robot trajectory planning processing section 13, so that the welding torch 2 is controlled in the left-right direction, the up-down direction, and the rotational direction with respect to the welding direction, and arc tracking is carried out for controlling the rotational center of the welding torch 2 during tracking correction. Then, such arc tracking is carried out with each weaving period, thereby making it possible to perform precise arc tracking and arc welding without any defective welding.

Although, in the foregoing description, the robot controller 8 that controls the tandem arc welding system 1 and the arc tracking controlling method using the robot controller 8 according to the present invention are specifically described with reference to preferred embodiments, the gist of the present invention is not limited thereto. Therefore, the present invention is to be broadly interpreted on the basis of the scope of the claims. In addition, various modifications, changes, etc. made on the basis of these descriptions are obviously included in the gist of the present invention.

What is claimed is:

1. A robot controller for controlling a position of a welding torch of a tandem arc welding system that performs arc welding while tracking a weld line, the tandem arc welding system including the welding torch having a leading electrode and a trailed electrode disposed apart from each other by a predetermined distance in a direction of the weld line, a robot that causes the welding torch mounted to an end of the robot to weave leftwards and rightwards with respect to a welding direction, a welding power supply that supplies electric power to the leading electrode and the trailed electrode, and a current/voltage detector that detects at least one of a welding current and a welding voltage during the weaving of the leading electrode and the trailed electrode, the robot controller comprising:

a leading-electrode processing section that calculates a leading-electrode changing amount on the basis of an electrical change of at least one of the welding current and the welding voltage of the leading electrode detected by the current/voltage detector, the leading-electrode changing amount corresponding to amounts of displacements of a weaving center trajectory of the welding torch in a left-right direction and an up-down direction with respect to the weld line;

a leading-electrode correcting section that calculates a leading-electrode correction amount on the basis of the leading-electrode changing amount, the leading-electrode correction amount being used for correcting the displacements of the weaving center trajectory in the left-right direction and the up-down direction;

a trailed-electrode processing section that calculates a trailed-electrode changing amount on the basis of an electrical change of one of the welding current and the welding voltage of the trailed electrode detected by the current/voltage detector, the trailed-electrode changing amount corresponding to an amount of displacement of the weaving center trajectory of the welding torch in a rotational direction with respect to the weld line;

a trailed-electrode correcting section that calculates a trailed-electrode correction amount on the basis of the trailed-electrode changing amount, the trailed-electrode correction amount being used for correcting the displacement of the weaving center trajectory in the rotational direction;

a rotational-displacement correction controlling processing section that, from a difference between a position of the leading electrode before performing the correction using the trailed-electrode correction amount and a position of the leading electrode after performing the correction using the trailed-electrode correction amount, calculates an amount of displacement of the leading electrode when the correction is performed using the trailed-electrode correction amount, and that, on the basis of the amount of displacement of the leading electrode, calculates a rotational-center correction amount used for correcting the displacement of the leading electrode; and a robot trajectory planning processing section that adds or subtracts the leading-electrode correction amount and the trailed-electrode correction amount, to correct a teaching position of a teaching trajectory that is previously calculated when the arc welding is performed, and that adds or subtracts the rotational-center correction amount to correct a position of a rotational center of the welding torch during tracking correction.

2. The robot controller according to claim 1, wherein the robot trajectory planning processing section adds or subtracts the trailed-electrode correction amount by rotation of the welding torch about a rotation center located at a position other than the leading electrode.

3. An arc tracking controlling method using a robot controller that controls a position of a welding torch of a tandem arc welding system that performs arc welding while tracking a weld line, the method comprising:
- a leading-electrode controlling step in which displacements of a weaving center trajectory in a left-right direction and an up-down direction with respect to the weld line are detected, and the position of the welding torch is controlled in the left-right direction and the up-down direction with respect to a welding direction, to correct the displacements in the left-right direction and the up-down direction;
- a trailed-electrode controlling step in which a displacement of the weaving center trajectory in a rotational direction with respect to the weld line is detected, and the position of the welding torch is controlled in the rotational direction, to correct the displacement in the rotational direction; and
- a rotational-center controlling step in which a displacement of the leading electrode caused by correction of the trailed electrode in the trailed-electrode controlling step is detected, and a rotational center of the welding torch during tracking correction is controlled, to correct the displacement of the leading electrode.

4. The arc tracking controlling method according to claim 3, wherein the leading-electrode controlling step includes
- a leading-electrode changing amount calculating step in which a leading-electrode processing section calculates a leading-electrode first changing amount and a leading-electrode second changing amount from an electrical change of at least one of a welding current and a welding voltage in one weaving period, the leading-electrode first changing amount indicating the displacement of the weaving center trajectory in the left-right direction with respect to the weld line, the leading-electrode second changing amount indicating the displacement of the weaving center trajectory in the up-down direction with respect to the weld line; and
- a leading-electrode correction amount calculating step in which a leading-electrode correcting section calculates a leading-electrode left-right correction amount on the basis of the leading-electrode first changing amount, and calculates a leading-electrode up-down correction amount on the basis of the leading-electrode second changing amount, the leading-electrode left-right correction amount being used for correcting the displacement of the weaving center trajectory in the left-right direction, the leading-electrode up-down correction amount being used for correcting the displacement of the weaving center trajectory in the up-down direction, wherein the trailed-electrode controlling step includes
- a trailed-electrode changing amount calculating step in which a trailed-electrode processing section calculates a trailed-electrode changing amount from an electrical change of a welding current and/or a welding voltage in the one weaving period, the trailed-electrode changing amount indicating the displacement of the weaving center trajectory with respect to the weld line; and
- a trailed-electrode correction amount calculating step in which a trailed-electrode correcting section calculates a trailed-electrode correction amount on the basis of the trailed-electrode changing amount, the trailed-electrode correction amount being used for correcting the displacement of the weaving center trajectory in the rotational direction with respect to the weld line, and wherein, in the rotational-center controlling step, a rotational-displacement correction controlling processing section calculates a rotational-center correction amount on the basis of the trailed-electrode correction amount, and controls the rotational center of the welding torch during the tracking correction, the rotational-center correction amount being used for correcting the displacement of the leading electrode when the correction is performed using the trailed-electrode correction amount.

5. The arc tracking controlling method according to claim 4, wherein the rotational-center controlling step includes
- a leading-electrode reference position calculating step in which a reference position of the leading electrode is calculated from a distance between the leading electrode and the rotational center of the welding torch when the tracking correction is performed and from torch orientation information indicating an orientation of the welding torch with reference to the robot; and
- a rotational-center correction amount calculating step in which the rotational-center correction amount is calculated from the reference position of the leading electrode and the trailed-electrode correction amount by determining a difference between a position of the leading electrode before performing the correction using the trailed-electrode correction amount and a position of the leading electrode after performing the correction using the trailed-electrode correction amount.

6. The method according to claim 3, wherein, in the trailed-electrode controlling step, the position of the welding torch is controlled in the rotational direction by rotation of the welding torch about a rotation center located at a position other than the leading electrode.

7. A tandem arc welding system that performs arc welding along a weld line, comprising:
- a welding torch having a leading electrode and a trailed electrode disposed apart from each other by a predetermined distance in a direction of the weld line;
- a robot having the welding torch mounted to an end thereof, the robot causing the welding torch to weave leftwards and rightwards with respect to a welding direction;
- a welding power supply that supplies electric power to the leading electrode and the trailed electrode;
- a current/voltage detector that detects at least one of a welding current and a welding voltage during the weaving of the leading electrode and the trailed electrode; and
- a robot controller that controls a position of the welding torch, wherein the robot control includes
- a leading-electrode processing section that calculates a leading-electrode changing amount on the basis of an electrical change of at least one of the welding current and the welding voltage of the leading electrode detected by the current/voltage detector, the leading-electrode changing amount corresponding to amounts of displacements of a weaving center trajectory of the welding torch in a left-right direction and an up-down direction with respect to the weld line;
- a leading-electrode correcting section that calculates a leading-electrode correction amount on the basis of the leading-electrode changing amount, the leading-electrode correction amount being used for correcting the displacements of the weaving center trajectory in the left-right direction and the up-down direction;
- a trailed-electrode processing section that calculates a trailed-electrode changing amount on the basis of an electrical change of one of the welding current and the welding voltage of the trailed electrode detected by the current/voltage detector, the trailed-electrode changing amount corresponding to an amount of displacement of the weaving center trajectory of the welding torch in a rotational direction with respect to the weld line;

a trailed-electrode correcting section that calculates a trailed-electrode correction amount on the basis of the trailed-electrode changing amount, the trailed-electrode correction amount being used for correcting the displacement of the weaving center trajectory in the rotational direction;

a rotational-displacement correction controlling processing section that, from a difference between a position of the leading electrode before performing the correction using the trailed-electrode correction amount and a position of the leading electrode after performing the correction using the trailed-electrode correction amount, calculates an amount of displacement of the leading electrode when the correction is performed using the trailed-electrode correction amount, and that, on the basis of the amount of displacement of the leading electrode, calculates a rotational-center correction amount used for correcting the displacement of the leading electrode; and a robot trajectory planning processing section that adds or subtracts the leading-electrode correction amount and the trailed-electrode correction amount, to correct a teaching position of a teaching trajectory that is previously calculated when the arc welding is performed, and that adds or subtracts the rotational-center correction amount to correct a position of a rotational center of the welding torch during tracking correction.

8. The welding system according to claim 7, wherein the robot trajectory planning processing section adds or subtracts the trailed-electrode correction amount by rotation of the welding torch about a rotation center located at a position other than the leading electrode.

* * * * *